(12) United States Patent
Pammer et al.

(10) Patent No.: US 6,567,200 B1
(45) Date of Patent: May 20, 2003

(54) PHOTOELECTRIC CURRENT AMPLIFYING CIRCUIT

(75) Inventors: Raimund Pammer, Graz (AT); Helmut Rieder, Graz (AT)

(73) Assignee: Efkon-Entwicklung, Forschung & Konstruktion Von Sondermaschinen Ges. m.b.H., Graz (AT)

( * ) Notice: Subject to any disclaimer, the term of this patent is extended or adjusted under 35 U.S.C. 154(b) by 0 days.

(21) Appl. No.: 09/462,618

(22) PCT Filed: Jul. 9, 1998

(86) PCT No.: PCT/AT98/00168

§ 371 (c)(1),
(2), (4) Date: Jan. 10, 2000

(87) PCT Pub. No.: WO99/03218

PCT Pub. Date: Jan. 21, 1999

(30) Foreign Application Priority Data

Jul. 10, 1997 (AT) .............................................. 1188/97

(51) Int. Cl.[7] .............................................. H04B 10/06
(52) U.S. Cl. ........................................ 359/189; 359/194
(58) Field of Search ................................ 359/161, 189, 359/194; 250/336.1, 338.1, 338.4, 370.01, 372, 200, 551

(56) References Cited

U.S. PATENT DOCUMENTS

| | | | | |
|---|---|---|---|---|
| 4,257,125 A | * | 3/1981 | Theall, Jr. ................ 250/201.6 |
| 4,257,126 A | * | 3/1981 | Theall, Jr. .................... 341/70 |
| 4,481,676 A | * | 11/1984 | Eumurian et al. .......... 359/195 |
| 4,651,111 A | * | 3/1987 | Wagner et al. .......... 250/214 A |
| 4,942,385 A | * | 7/1990 | Kobayashi et al. .......... 250/221 |
| 5,117,099 A | * | 5/1992 | Schmidt .................. 250/208.2 |
| 5,343,033 A | * | 8/1994 | Cain ...................... 250/214 A |
| 5,355,242 A | | 10/1994 | Eastmond et al. |
| 5,389,778 A | * | 2/1995 | Shinomiya .................. 359/161 |
| 5,410,145 A | | 4/1995 | Coroy |
| 5,486,690 A | * | 1/1996 | Ake ........................... 359/154 |
| 5,760,942 A | * | 6/1998 | Bryant .................... 250/208.2 |
| 5,790,295 A | * | 8/1998 | Devon ........................ 250/221 |
| 6,414,776 B1 | * | 7/2002 | Omata |

FOREIGN PATENT DOCUMENTS

| | | |
|---|---|---|
| AT | 376 083 | 10/1984 |
| GB | 2 156 177 | 10/1985 |

* cited by examiner

Primary Examiner—Jason Chan
Assistant Examiner—Sherif Fahmy
(74) Attorney, Agent, or Firm—Collard & Roe, P.C.

(57) ABSTRACT

A data receiver circuit for infrared signals, in particular for toll systems on roads, comprises several infrared detectors (5) the signals of which are supplied to a summing circuit so as to increase the useful power while suppressing interfering signals. To improve the signal/noise ratio, it is provided that several input circuits are provided with an infrared detector (5a, 5b to 5n) each and with an associated separate amplifier (6a, 6b to 6n), and that these input circuits are connected in parallel to the summing circuit (7).

6 Claims, 2 Drawing Sheets

PHOTOELECTRIC CURRENT AMPLIFYING CIRCUIT

The invention relates to a data receiver circuit for infrared signals comprising a plurality of infrared detectors the signals of which are supplied to a summing circuit to increase the useful power while suppressing interfering signals.

Data transmitter and data receiver circuits for infrared signals are known e.g. with TV sets for program selection, volume adjustment etc. Also for toll systems on roads, transmitters in the infrared range comprising semiconductor light transmitting elements, such as luminescence diodes or laser diodes, have been suggested instead of radiofrequency transmitters in the decimeter or centimeter wave length range. Such infrared data transmission systems can be operated with the following types of modulation:

| | |
|---|---|
| AM | amplitude modulation |
| FM | frequency modulation |
| PSK | phase shift keying |
| ASK | amplitude shift keying |
| ASK-OOSK | ASK on off shift keying |
| PDM | pulse duration modulation |
| PPM | pulse phase modulation |

In the data receiver circuit, germanium or silicon photodiodes are used as infrared detectors, the resulting "photo (electric) current" being amplified and evaluated. If such data receiver circuits are used in surroundings having little background light, e.g. in the interior of a building, in the shade or only during the night, simple amplifiers and compensation circuits will suffice to suppress the background photo current. With increasing background photo current, in particular during operation of the receivers in direct sunlight, these earlier circuit techniques do, however, give rise to problems and finally become useless, since the high background photo current i.a. causes a high current noise in which the useful signal currents, commonly in the nA range, get lost.

From AT 376 083 B, a circuit for suppressing electromagnetic interferences in infrared receiver devices is known. There, two groups of photodiodes connected in parallel are provided, the one diodes being connected to a positive supply voltage via a series resistor R1, and the other diodes being connected to ground via a series resistor. From the one group of photodiodes, useful signals of negative polarity are supplied via a capacitor to one input of a difference amplifier, whereas the useful signals of positive polarity are supplied via a capacitor to the other input of the difference amplifier. In this manner, the useful signals should occur summed at the output of the difference amplifier, whereas an interfering radiation, coming, e.g., from radio stations, is suppressed. In a modified embodiment, additional operational amplifiers are provided between the capacitors and the inputs of the difference amplifier DV, wherein these operation amplifiers, as so-called transimpedance amplifiers, are to enable more rapid signal processing.

Also in the circuit shown in U.S. Pat. No. 5,355,242 A for receiving infrared signals, two groups of photodiodes connected in parallel, cf. FIG. 1, are provided, the useful signals of which are supplied via transformers and capacitors to transimpedance amplifiers; the secondary windings of the transformers are reversed in phase so as to obtain useful signals of positive and negative polarities which—similar to AT 376 083 B—are supplied via transimpedance amplifiers after having passed a band pass filter. The outputs of the difference amplifier are connected to the inputs of a further difference amplifier via low-pass filters, a gate circuit acting as a noise barrier being connected to the outputs of the further difference amplifier. Thus, summing of the useful signals in this circuit occurs at the connection point of the parallel-connected photodiodes with the primary winding of the respective transformer.

In the known circuits it is disadvantageous that if several infrared detectors (photodiodes) are connected in parallel to each other to increase the useful power, also the parallel capacity of the diodes is increased, whereby in turn the switching rise times and switching decay times are increased.

It is an object of the invention to provide a data receiver circuit of the initially mentioned type in which short switching rise times and short switching decay times are achieved, on the one hand, and in which the useful data signal/noise ratio is high despite a high current noise caused by an intensive background light.

In a data receiver circuit of the above-defined kind, this object is achieved according to the invention in that several input circuits, each having an infrared detector and an associated separate amplifier, are provided, and these input circuits are connected in parallel to the summing circuit. In this manner, the amplifiers act signal-synchronously, yet they have spontaneous noise phases which partially add up and partially cancel themselves out in the summing circuit, according to the law of probability. In contrast, the useful signal is added up linearly with equal phase in the summing circuit. On the whole, thus, the signal/noise ratio increases constantly with the number of amplifiers used.

According to an advantageous embodiment of the invention it is provided that the output of the summing circuit is connected to the input of a comparator the other input of which is connected to the output of a threshold value generator, the input of which is connected to the output of the summing circuit. In this manner, the function of an AGC (automatic gain control) amplifier circuit is simulated in that useful signals of weak power are suppressed, or, if several transmitters are present, such as, e.g., at the toll site in a toll system on a road, only the transmitter transmitting with the highest power is received; in toll systems comprising several lanes and corresponding transmitters, this will be of particular importance with a view to a "lane selectivity".

In this connection it is also suitable if a main amplifier is provided between the output of the summing circuit and the one input of the comparator as well as the input of the threshold value generator. By this measure, the dynamic range for further processing of the useful signal can be increased.

For the automatic threshold value adjustment, it is furthermore particularly advantageous that, by rectifying and smoothing the output signal of the summing circuit and, optionally, of the main amplifier, the threshold value generator forms a sum of the peak value and the mean value of this signal in a pre-determined ratio, e.g. 1:2, which sum is delivered as a threshold value signal at the output of the threshold value generator.

With a view to a particularly suitable, simple and rapidly reacting embodiment of the amplifier it is suitable if the amplifiers of the input circuits are transistor amplifiers. The transistors in that instance may be simple bipolar transistors.

To keep the summing circuit as simple and cheap as possible, it has furthermore proven advantageous if the summing circuit is formed with capacitors which are connected to the respective amplifier output, on the one hand, and to a common connection point, on the other hand.

An embodiment which is particularly preferred due to the simple configuration of the input circuits is obtained if the infrared detectors are photodiodes which are connected in parallel to the emitter resistors of transistors; advantageously, the capacitors of the summing circuit are connected to the collector resistors of the transistors.

Finally, to form the threshold value, it has proven suitable with a view to short reaction times and a simple realization thereof if the input of the threshold value generator is connected to ground via a diode and a resistor arranged in series, that the connection point between the diode and the resistor is connected to the base of a transistor to which a capacitor storing the peak value of the supplied output signal of the summing circuit and, optionally, of the main amplifier is connected, and that a further capacitor is connected to the diode, or to the capacitor, respectively, to obtain the respective threshold value via a voltage divider circuit.

The invention will be further explained by way of preferred exemplary embodiments illustrated in the drawings to which, however, it shall not be restricted.

Figure 1:
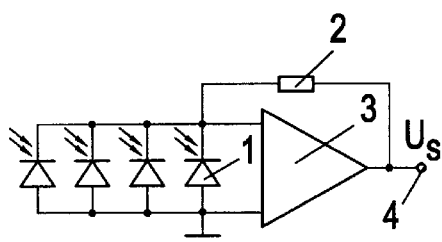
FIG. 1 shows a circuit of a conventional data receiver circuit.
Figure 2:
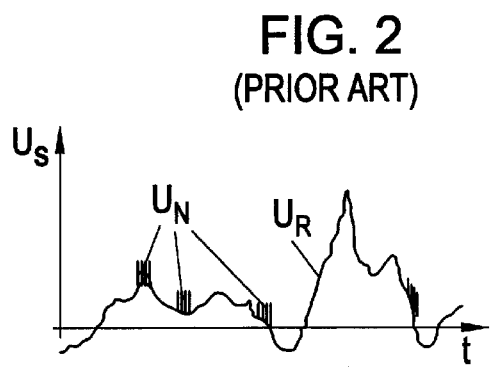
FIG. 2 shows a diagram illustrating the useful signal/noise ratio in the circuit according to FIG. 1.

The conventional data receiver circuit for infrared signals illustrated in FIG. 1 consists of an infrared detector, e.g. in the form of one or several infrared photodiodes 1 connected in parallel, which are connected to the inputs of an operational amplifier 3 with negative feedback via a resistor 2. The amplified signal voltage $U_S$ occurring at the output 4 of the operation amplifier 3 is illustrated in FIG. 2 in dependence on the time t. It may be seen that the useful signal $U_N$ received by the photodiode 1 hardly differs from the noise voltage $U_R$ which—as initially mentioned—is mainly caused by the background photo current. Neither does the parallel connection of the additional photodiodes 1 indicated in FIG. 1 improve the signal/noise ratio, yet it causes a deterioration of the switching times as a consequence of an increased capacity.

Figure 3:
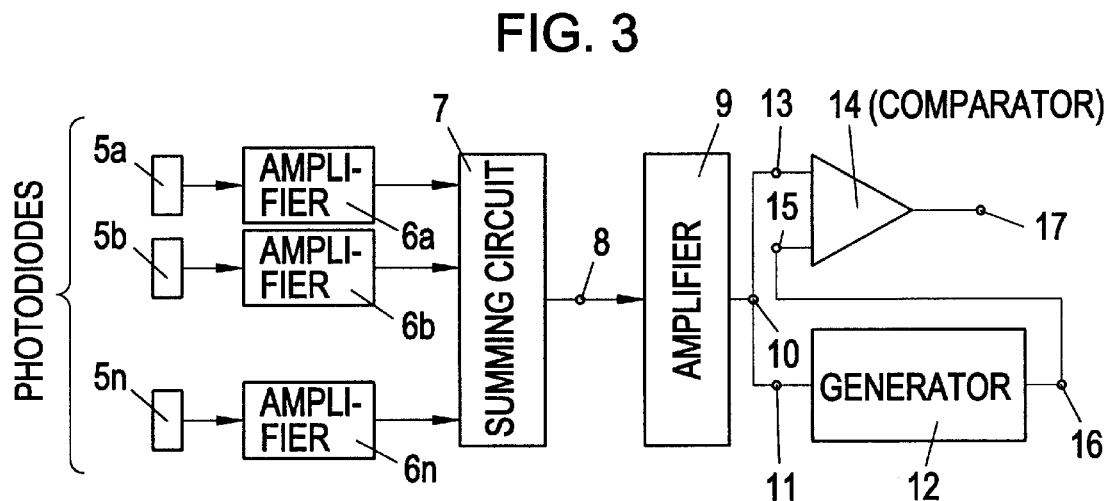
FIG. 3 shows a block diagram of a data receiver circuit according to the invention.

The invention now provides for the arrangement of several input circuits and several infrared photodiodes 5a, 5b to 5n in a certain manner, i.e. each with a separate amplifier 6a, 6b to 6n, the outputs of the amplifiers 6a, 6b to 6n being supplied to a summing circuit 7, as is illustrated in the block diagram according to FIG. 3. The sum signal at the output 8 of summing circuit 7 is supplied to a main amplifier 9 to the output 10 of which an input 11 of a threshold value generator 12 as well as an input 13 of a comparator 14 are connected; the other input 15 of the comparator 14 is connected to the output 16 of the threshold value generator 12.

Figure 4:
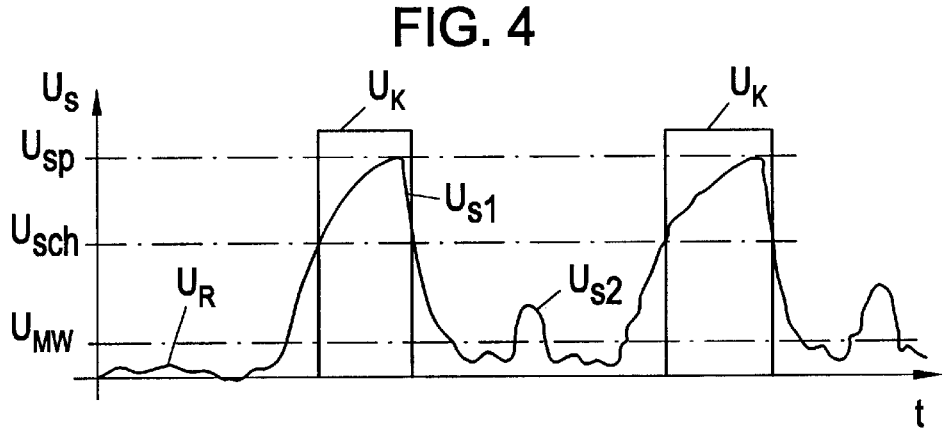
FIG. 4 shows a diagram explaining the function of a part of the data receiver circuit according to FIG. 3.

In FIG. 4, signal $U_S$ emitted by the main amplifier 9 is illustrated in dependence on the time t. A strong data signal $U_{S1}$, and a weak data signal $U_{S2}$ are superimposed on the noise voltage $U_R$. The strong data signal $U_{S1}$, may, e.g., come from a first infrared transmitter directed directly to the photodiodes 5a, 5b to 5n, whereas the weaker data signal $U_{S2}$ may come from a different, second infrared transmitter located, e.g., laterally of the first infrared transmitter and thus having a small amplitude. The threshold value generator 12 will now determine a threshold value voltage $U_{Sch}$ in dependence on the peak value $U_{Sp}$ of the (strongest) data signal $U_{S1}$, and on the mean value $U_{Mw}$ of the entire signal $U_S$, which threshold value voltage will be compared in the comparator 14 with the useful signal $U_S$ so that, when the threshold voltage $U_{Sch}$ is exceeded or fallen below by the signal $U_S$ at the output 17 of the comparator 14, only regenerated pulses $U_K$ according to the signal $U_{S1}$, will occur which will be supplied to a consecutive data processing unit (not illustrated) for further processing.

In this manner, a selective signal evaluation is effected by increasing the signal/noise ratio if there exists a data signal and suppressing weaker data signals of other transmitters. In particular, it is provided that the threshold value voltage $U_{Sch}$ is calculated from the peak value $U_{Sp}$ and the mean value $U_{Mw}$ approximately at a ratio of 1:2. The mode of operation of the threshold value generator in its function is comparable with that of an AGC (automatic gain control) amplifier.

In the following, a practical embodiment of the present data receiver circuit (without comparator 14) will be described by way of FIG. 5.

Figure 5:
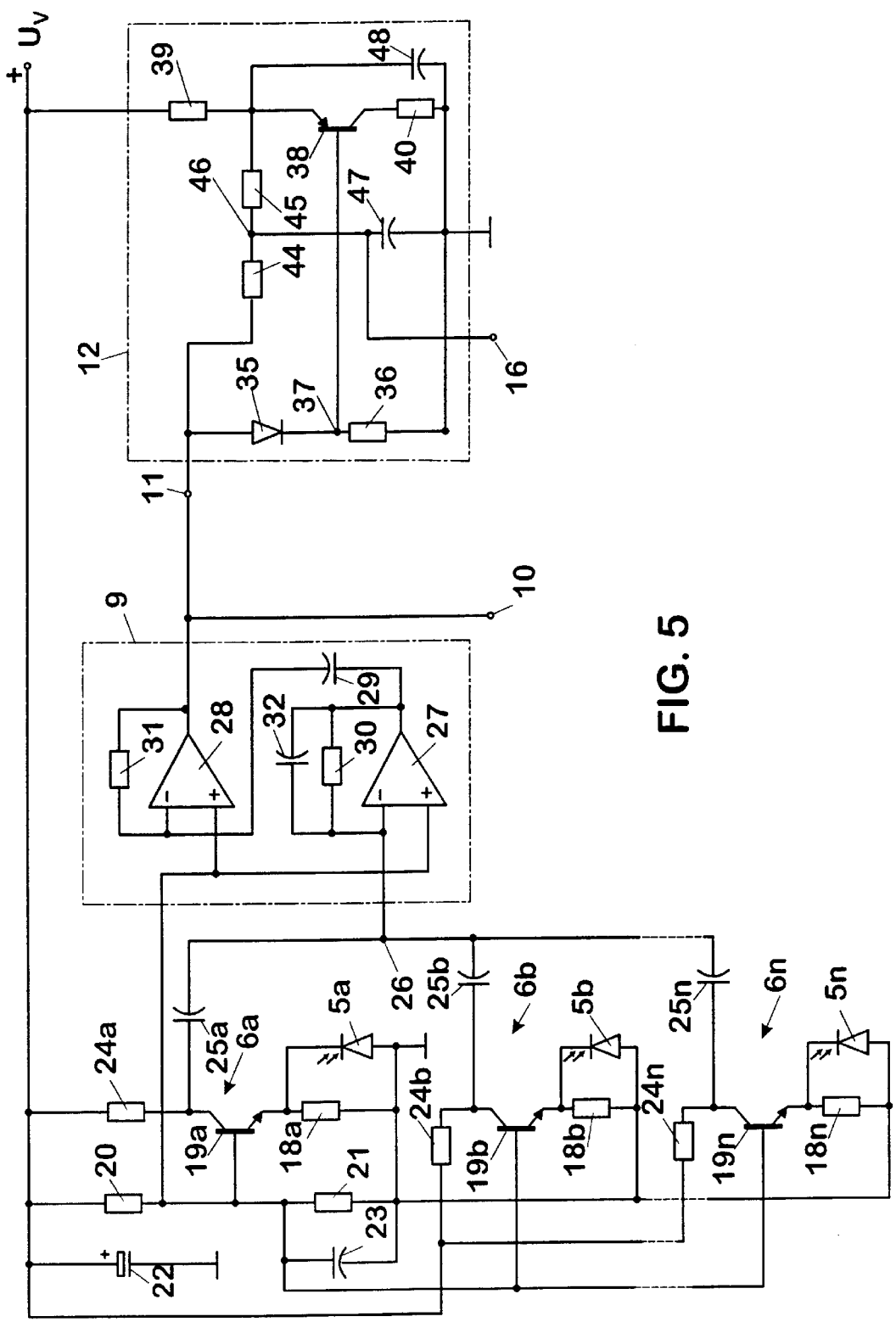
FIG. 5 shows a circuit diagram of a part of the at least at present particularly preferred embodiment of the data receiver circuit according to the invention.

According to FIG. 5, each of the infrared photodiodes 5a, 5b to 5n is located in parallel to an emitter resistor 18a, 18b to 18n of npn transistors 19a, 19b to 19n which form the amplifiers 6a, 6b to 6n mentioned above with reference to FIG. 3. A base voltage divider common for all the transistors 18a, 18b to 18n is formed by the resistors 20, 21, resistor 20 being connected with a positive supply voltage $U_V$ and resistor 21 being connected to ground; the connection point of the two resistors 20, 21 is connected to the base electrodes of the transistors 19a, 19b to 19n. A buffer capacitor 22 is provided between ground and the supply voltage $U_V$. A filtering capacitor 23 is arranged in parallel to the resistor 21.

The collectors of the transistors 19a, 19b to 19n are each connected via a collector resistor 24a, 24b to 24n of the supply voltage $U_V$. From each collector of the transistors 19a, 19b to 19n, a respective coupling capacitor 25a, 25b to 25n leads to a common connection point 26, and thus to the summing circuit 7 mentioned above with reference to FIG. 3 for the signals delivered by the photodiodes 5a, 5b to 5n and pre-amplified by the transistors 19a, 19b to 19n, whose noise portions stochastically overlay on the connecting point 27, i.e. partly add up and partly cancel themselves out, whereas the useful signals are added up linearly and with equal phase position so that the signal/noise ratio increases with the number n of the photodiodes 5.

The main amplifier 9 consists, e.g., of two successively connected operational amplifiers 27, 28, the inverting input (−) of the one amplifier 27 being connected to the connection point 26 of the coupling capacitors 25a, 25b to 25n. The output of the amplifier 27 is connected to the inverting input (−) of the other amplifier 28 via a coupling capacitor 29, the output of the amplifier 28 forming the output 10 of the main amplifier 9. The amplifiers 27, 28 comprise negative feedback via resistors 30, 31, one capacitor 32 being connected in parallel to the resistor 30 of the one amplifier 27. The non-inverting inputs (+) of the two amplifiers 27, 28 are connected to the base of the transistor 19a. By appropriately dimensioning the resistors 30, 31 and the capacitors 29, 32, the lower cut-off frequency of the main amplifier can be adapted selectively to the frequency $f_0$ of the useful signal $U_N$.

In FIG. 5, the electronic element groups forming the main amplifier 9 and the threshold value generator 12, respectively, are each surrounded by dot-and-dash lines.

From the input 11 of the threshold value generator 12, a series arrangement of a diode 35 and a resistor 36 is connected to ground. The connection point 37 between the cathode of diode 35 and the resistor 36 is connected to the base of a pnp transistor 38 the emitter resistor 39 of which is connected to the positive supply voltage $U_V$, and the collector resistor 40 of which is connected to ground. Between the input 11 of the threshold value generator 12 and the collector of the pnp transistor 38, a voltage divider is arranged which is formed by two resistors 44 and 45, a capacitor 47 at the connection point 46 of the two resistors 44, 45 being connected to ground. A further capacitor 48 is connected to ground from the collector of the transistor 38. The connection point 46 of the resistors 44, 45 forms the output 16 of the threshold value generator which will have the variable threshold value $U_{Sch}$ produced in each case in adaptation to the power of the (most powerful) useful signal $U_S$ at point 10, or 11, respectively. Of the above-mentioned types of modulation, preferably the ASK-OOSK modulation is used, i.e. series of infrared pulse packages are emitted by an infrared transmitter (not illustrated) in per se conventional manner, the infrared pulse packages being converted into electrical pulses by the photodiodes 5a, 5b to 5n and occurring on the output 10 (11) as signal $U_S$.

In its resting state, i.e. if no pulses occur, transistor 38 carries a low collector no-signal current which causes charging of the condenser 47 to a voltage of approximately half the supply voltage $U_V$. The working point of the transistor 38 is adjusted such that the capacitor 48 likewise will be charged to a value of approximately half the supply voltage $U_V$.

If pulses occur, the transistor 38 will be completely blocked at each pulse for the duration of the pulse, i.e. the capacitors 47 and 48 will be discharged during this period of time and re-charged during the pulse pauses. By selecting the values of the resistors 36, 44 and 45 and the capacitors 47, 48, it will then be possible to determine, in dependence on the pulse duration and pulse pause, the appropriate time constants for charging and discharging the capacitors 47, 48, or the voltages, respectively, which correspond to the peak value $U_{Sp}$, or to the mean value $U_{Mw}$, respectively, of the data signal $U_S$ so as to determine therefrom the threshold value voltage $U_{Sch}$ in the desired ratio, as has been indicated above.

The voltage occurring on the diode 35 after several pulses, e.g. after three pulses, is proportional to the rectified value, or mean value $U_{Mw}$, respectively, of the data signal $U_S$, whereas the voltage occurring on the capacitor 48 will be proportional to the peak value $U_{Sp}$ of the data signal $U_S$. Via the resistors 44 and 45, each one of both voltage values will be integrated at their common capacitor 47, i.e. at the ratio of the values of the resistors 44 and 45. To obtain the desired ratio of, e.g. 1:2, between the peak value $U_{Sp}$ and the mean value $U_{Mw}$, the value of the resistor 44 will be chosen to be twice as high as the value of the resistor 45. Of course, also other ratios may be obtained by appropriately dimensioning the resistors 44, 45, it also being possible to use a potentiometer instead of the two resistors 44, 45, for continuously adjusting the threshold value voltage $U_{Sch}$ selectively in relation to the peak value $U_{Sp}$.

What is claimed is:

1. A data receiver circuit for infrared signals comprising several infrared detectors (5a, 5b to 5n) the signals of which are supplied to a summing circuit (7) to increase the useful power while suppressing interfering signals, characterized in that several input circuits, each having an infrared detector (5a, 5b to 5n) and an associated separate transistor amplifier (19a, 19b to 19n) are provided, the transistor amplifiers (19a, 19b to 19n) being connected in emitter connection, each with photodiodes, as infrared detectors, connected in parallel to emitter resistors (18a, 18b to 18n), their collectors being connected via coupling capacitors (25a, 25b to 25n) so as to form the summing circuit with a common connection point (26).

2. A data receiver circuit according to claim 1, characterized in that the output (8) of the summing circuit (7) is connected to the input (13) of a comparator (14) the other input (15) of which is connected to the output (16) of a threshold value generator (12), the input (11) of which is connected to the output (8) of the summing circuit (7).

3. A data receiver circuit according to claim 2, characterized in that a main amplifier (9) is provided between the output (8) of the summing circuit (7) and the one input (13) of the comparator (14) as well as the input (11) of the threshold value generator (12).

4. A data receiver circuit according to claim 2, characterized in that, by rectifying and smoothing the output signal ($U_S$) of the summing circuit (7), the threshold value generator (12) forms a sum of the peak value ($U_{Sp}$) and the mean value ($U_{Mw}$) of this signal ($U_S$) in a pre-determined ratio, which sum is delivered as a threshold value signal ($U_{Sch}$) at the output (11) of the threshold value generator (12).

5. A data receiver circuit according to claim 1, characterized in that the capacitors (25a, 25b to 25n) of the summing circuit (7) are connected to collector resistors (24a, 24b to 24n) of the transistors (19a, 19b to 19n).

6. A data receiver circuit according to claim 4, characterized in that the input (11) of the threshold value generator (12) is connected to ground via a diode (35) and a resistor (36) arranged in series, that the connection point (37) between the diode (35) and the resistor (36) is connected to the base of a transistor (38) to which a capacitor (48) storing the peak value ($U_{Sp}$) of the supplied output signal of the summing circuit (7) is connected, and that a further capacitor (47) is connected to the diode (35), and to the capacitor (48), respectively, to obtain the respective threshold value ($U_{Sch}$) via a voltage divider circuit (44, 45).

* * * * *